Figure 1:
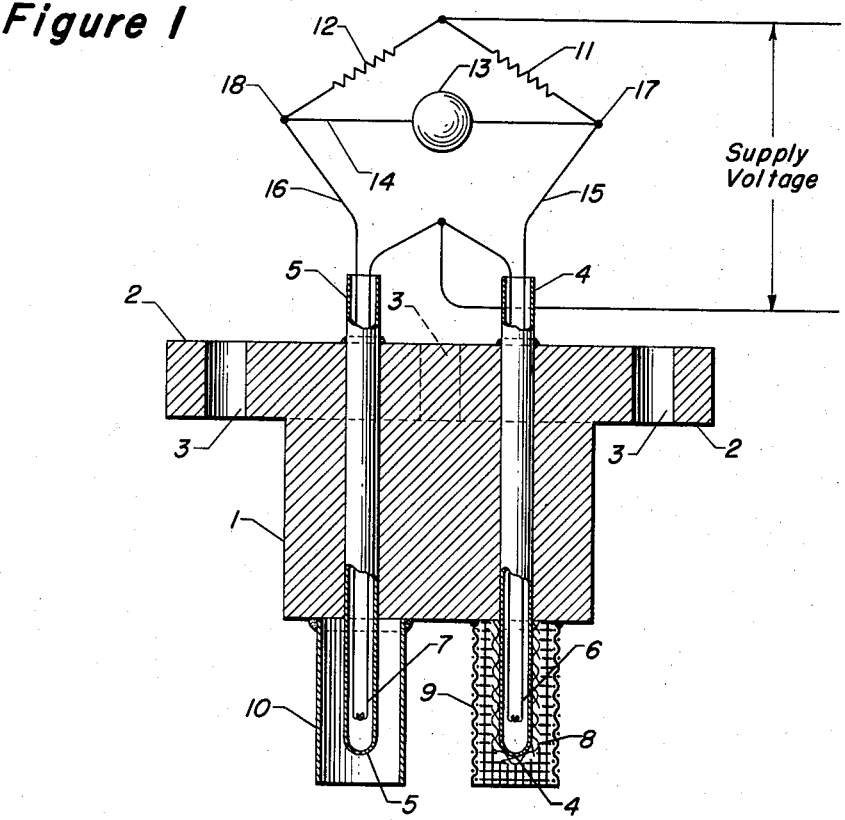

Aug. 5, 1958  L. B. EDDY  2,845,790
ENTRAINED LIQUID DETECTOR
Filed June 2, 1954

INVENTOR:
Lee B. Eddy

By: Chester J. Giuliani
Philip S. Liggett
ATTORNEYS:

United States Patent Office 2,845,790
Patented Aug. 5, 1958

2,845,790

ENTRAINED LIQUID DETECTOR

Lee B. Eddy, Evanston, Ill., assignor to Universal Oil Products Company, Des Plaines, Ill., a corporation of Delaware Application June 2, 1954, Serial No. 433,916

1 Claim. (Cl. 73—29)

This invention has for its object the detection of entrained liquid in flowing gas streams and relates particularly to a method and means of detecting entrained liquid in flowing gas streams.

In one embodiment this invention relates to an apparatus for detecting entrained liquid in a gas stream which comprises in combination a first temperature sensitive means in contact with a dry liquid-absorbing material, a second temperature sensitive means and a temperature difference indicating means actuated by the aforesaid first and second temperature sensitive means.

In another embodiment this invention relates to a method for detecting entrained liquid in a flowing gas stream which comprises passing said gas stream into contact with a first temperature sensitive means in contact with a dry liquid-absorbing material and a second temperature sensitive means, said first and second temperature sensitive means actuating a temperature difference indicating means whereby entrained liquid evaporating from said absorbing material causes said temperature difference indicating means to respond to the temperature difference thereby caused.

The basis of this invention is that an adiabatic evaporation produces a lowering of the temperature in the vicinity of the evaporation. This principle is used in the well known wet bulb method of determining relative humidity. In the operation of the present invention a bulb capable of becoming a wet bulb and a separate dry bulb, or their equivalents, are placed in a flowing gas stream wherein it is desired to have no liquid entrained or for which an indication of the relative amount of entrained liquid is desired. When liquid entrainment occurs, the temperature sensitive means that is in contact with the liquid-absorbing material will be cooled because the absorbing material will be moistened by the entrained liquid, thereby becoming a wet bulb, and the subsequent evaporation will cause the temperature sensitive means to indicate the lowered temperature by the well known hereinbefore described principle.

The operation and utility of the present invention may perhaps be best described with reference to some particular uses wherein it may be advantageously employed. One class of use is to detect liquid entrainment in the gas stream discharging from a liquid-gas contacting device wherein it is desired to completely disengage the liquid from the gas. One specific example of such a use would be to install the device of the present invention in the discharge line or in the uppermost contacting stage of a fractionation column so that the limiting vapor velocity could be readily obtained. Thus, when the vapor velocity through the column becomes so great so that as to entrain liquid droplets from any tray in the vapor stream and physically convey this entrained liquid to the next contacting stage, or in the case of the uppermost stage into the overhead discharge line, it may be seen that the degree of fractionation or separation effected will be reduced. Customarily, the bad effects of liquid entrainment in a fractionation column are not known until the overhead product is analyzed. By installing the device of the present invention in the uppermost contacting tray or the vapor discharge line of a fractionation column, the limiting vapor velocity of the column may be ascertained by the temperature difference indicating device associated with the apparatus of this invention which responds immediately to indicate that the vapor stream has liquid entrained therein. The device of this invention may be installed on any of the contacting trays or in an extreme case on all of them, however it will usually be desirable only to maintain this device in the uppermost tray.

Other liquid-gas contacting processes that may advantageously employ the apparatus and method of this invention include such processes as gas scrubbing, wherein a gas is contacted with a liquid which adsorbs or reacts with an undesirable component of the gas to remove it from the gas stream such as desulfurization of a hydrogen-containing gas stream by contacting it countercurrently with diethanolamine solution or caustic solution, the humidification of a gas stream by contacting it with water, etc.

The apparatus and method of this invention may be used in other applications not associated with liquid-gas contacting as for example it may be used to detect leaks in liquid cooling jackets, coils or tubes. One such use may be to detect liquid entrainment resulting from a leaking cooling tube in a stream of dry air or other gas used to cool an electric motor which gas is circulated into indirect heat exchange with a water cooler. Such a stream must contain dry gas to prevent moisture damage to the electric equipment. In many applications a quantity of air is treated to both clean and dry it and this air is circulated cyclically through the motor to be cooled and through an indirect heat exchange means that removes heat from the air. It may readily be seen that in this particular application small quantities of water entrained in the cooling air stream will result in severe damage to the relatively expensive electric equipment and therefore it is of primary importance that any small amount of liquid entrained in the gas stream be immediately detected so that the damage may be prevented.

The temperature sensing device maintained within the flowing gas stream may be any of the conventional temperature sensitive means that are readily available such as simple mercury thermometers, thermocouples, electric resistance elements, bi-metal strips, etc. The preferred means are the electric sensing devices such as thermocouples and resistance elements and the particularly preferred means is a resistance element. The ultimate temperature difference indicating means may be an instrument that indicates or records the temperature difference, an audible signal, a visible signal or any combination of these. When the preferred temperature sensing means, that is a resistance element, is used the preferred temperature difference indicating means is a galvanometer or other current-sensing device associated with a Wheatstone bridge circuit; however for various applications the current-sensing device may merely be a means of actuating a signal such as a bell, an annunciator or a light.

Depending upon the type of gas stream used, the velocity of the stream and the presence or absence of solid or liquid particles, the temperature sensitive means disposed in the gas stream may be shielded or otherwise protected. The absorbing material in contact with one of the temperature sensing means is preferably fabric such as cotton, asbestos, fiber glass, etc. or it may be a bonded coating such as silica gel, alumina gel, etc. This absorbing material is usually destructable and therefore may be protected by positioning a screen or grill either completely around the temperature sensing means in contact with the absorbing material or at least around the portion that is on the upstream side thereof. A solid baffle which may be circular, triangular, flat or otherwise shaped may be placed upstream of the temperature sensitive means not in contact with the absorbing material for the purpose of preventing damage due to impact of material entrained in the gas stream and for the purpose of maintaining this temperature sensitive means dry by preventing contact between it and entrained liquid.

Although the method of this invention may be used by placing two independent temperature sensitive means into a flowing stream it is preferred that the method be effected through the use of a compact unitary apparatus which disposes the two temperature sensitive means in the gas stream so that they are relatively close to each other and are exposed to gas of similar temperature and constituency. The apparatus is preferably a plug type of insert drilled with two holes which are aligned to be perpendicular to the gas stream, one hole for receiving each of the temperature sensitive means. The plug may be screwed or flanged into the conduit or vessel that contains the flowing gas stream and may be provided with thin walled and relatively small diameter tubes which extend into the flowing gas stream and which are suitably adapted to receive the temperature sensing means.

The process and apparatus of the present invention can best be explained with reference to the accompanying drawing which illustrates one suitable embodiment of this invention and is intended to illustrate rather than limit the invention to the particular embodiment herein illustrated.

Figure 2:
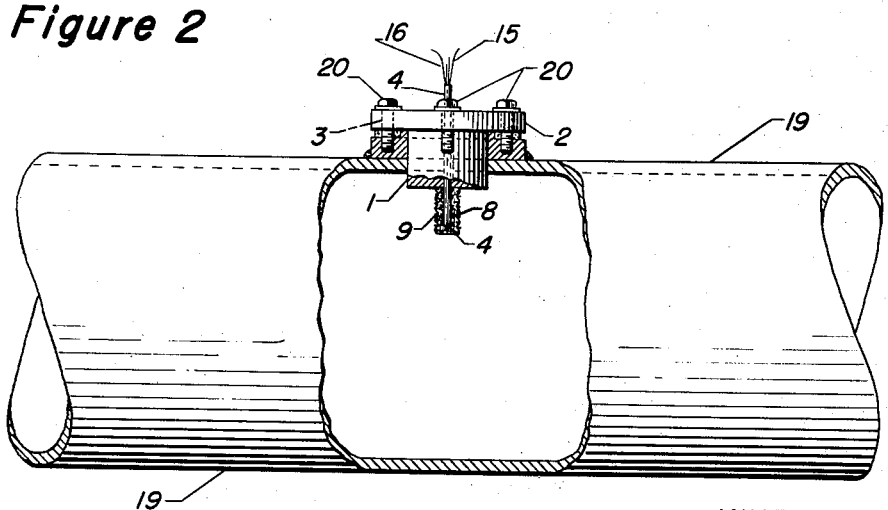

Figure 1 shows a cross-sectional view of the apparatus with a schematic representation of the electric connections thereto and Figure 2 illustrates one means of installing the apparatus of Figure 1 into a flowing gas stream.

Referring now to the drawing, in Figure 1 metal plug 1 adapted with flange 2 which contains holes 3 for securing the assembly to the place where it is to be used, is drilled to receive thin walled tubes 4 and 5. These tubes extend through plug 1 and are sealed to the main body thereof by such means as welding, silver soldering, etc. to form an hermetic seal. The tubes 4 and 5 contain identical resistance elements 6 and 7 in the upper portions thereof. Resistance element 6, which is contained in tube 4, is substantially at the temperature of the upper portion of tube 4 and the upper portion of tube 4 is at a temperature dependent upon the temperature of the flowing gas stream as altered by the effects of evaporation of liquid material from fabric covering 8. Screen 9 may be disposed on the end of plug 1 for the purpose of protecting fabric covering 8.

The beforementioned tube 5 containing resistance element 7 functions similarly to tube 4 and element 6. Therefore, resistance element 7 is substantially at the temperature of the upper portion of tube 5, however the temperature of tube 5 is unaffected by entrained liquid inasmuch as the liquid does not come in contact with it, tube 5 being shielded by baffle 10 on the upstream side so that the temperature measured by resistance element 7 is substantially that of the flowing gas stream.

In this particular embodiment resistance elements 6 and 7 form two of the resistances of a Wheatstone bridge which is completed by identical resistances 11 and 12 and connected to a supply voltage as indicated. Thus, when the temperature of the identical resistance elements 6 and 7 are the same, current sensing device 13 will indicate no flow of electric current through line 14 because any current resulting from the supply voltage will pass equally through resistances 6 and 7 and also equally through resistances 11 and 12 so that there will be no electromotive force tending to make current flow through line 14 and therefore through current-sensing device 13. When, however, entrained liquid in the flowing gas stream causes fabric 8 to become wet and the flowing gas stream evaporates the wet liquid from fabric 8 there results a cooling of the upper portion of tube 4 which conducts heat away from resistance element 6 thereby reducing its temperature. As a result of the reduced temperature, resistance element 6 has a diminished resistance to the flow of electric energy from the supply voltage and therefore greater current will flow through line 15 and lesser current through line 16. As a result of the unequal current flow in conductors 15 and 16 there will be a voltage difference between points 17 and 18 and a current will flow through line 14 which actuates device 13. It may readily be seen that current-sensing device 13 may indicate a value by means of a suitable scale and pointer, or may operate a switch to sound a bell or horn or to cause a light to flash thereby warning of liquid entrainment in the flowing gas stream.

Figure 2 illustrates the apparatus of the present invention installed as it is to be used. Thus, in Figure 2 plug 1 extends through wall 19 of the conduit or vessel in which the device is installed. The device is held in place by bolts 20 extending through flange 2 and fixedly attached to the wall of conduit 19. Temperature sensing means 6 extends into the flowing gas stream and, in this particular illustration superimposes temperature sensing means 7 so as to make 7 invisible, however it may be seen that the two temperature sensitive means are aligned perpendicular to the direction of the flow of the gas stream and therefore are subjected as nearly as possible to identical conditions.

As hereinbefore stated the drawing and the accompanying descriptive material represent only one embodiment of this invention and may be subjected to wide modification within the broad scope of this invention. Thus the temperature sensitive means may be directly in the gas stream and may transmit impulses through a suitably insulated wire leading directly through the container wall. One temperature sensitive means may also be permanently coated with a liquid absorbing material such as silica gel, when disposed in the stream so that protective measures will not be required. The indicating device may further be calibrated to give a quantitative indication of the degree of entrainment as well as a qualitative indication of the presence or absence of it.

From the foregoing it may be seen that the present invention provides a rapid means of indicating the presence and/or amount of liquid entrainment in a flowing gas stream by means of a compact inexpensive unitary device which may be readily attached or adapted to existing equipment and is easily adaptable to being used remote from its point of observation.

What is claimed is:

An apparatus for indicating entrained liquid in a gas stream which comprises a plug member adapted to be inserted in the gas stream, a pair of thin walled tubes extending through said member, a dry liquid-absorbing material chemically inert with respect to said liquid covering the exposed portion of one of said tubes and the exposed portion of the other tube being uncovered but shielded by a baffle from contact with liquid in said gas stream, identical temperature sensitive elements in said tubes, and temperature difference indicating means connected to and actuated by said temperature sensitive elements.

References Cited in the file of this patent
UNITED STATES PATENTS

| | | |
|---|---|---|
| 1,855,774 | Schneider | April 26, 1932 |
| 1,894,172 | Guthrie et al. | Jan. 10, 1933 |
| 2,154,927 | Yaglou | April 18, 1939 |

(Other references on following page)

UNITED STATES PATENTS

| | | |
|---|---|---|
| 2,210,862 | Tronstad | Aug. 6, 1940 |
| 2,398,333 | Shoemaker | April 9, 1946 |
| 2,603,972 | Kahn | July 22, 1952 |
| 2,623,391 | Malecki | Dec. 30, 1952 |
| 2,642,737 | Kinsella | June 23, 1953 |
| 2,703,983 | Lamb | March 15, 1955 |
| 2,732,710 | Richardson | Jan. 31, 1956 |

FOREIGN PATENTS

| | | |
|---|---|---|
| 364,272 | Germany | Nov. 20, 1922 |

OTHER REFERENCES

Article, Harris and Nash, published in Analytical Chemistry, vol. 23, No. 5, May 1951, pages 736–739.